United States Patent [19]

Powell

[11] Patent Number: 5,076,312

[45] Date of Patent: Dec. 31, 1991

[54] PRESSURE RELIEF DEVICE

[75] Inventor: Richard E. Powell, Pleasant Ridge, Mich.

[73] Assignee: Tip Engineering Group, Inc., Farmington Hills, Mich.

[21] Appl. No.: 470,344

[22] Filed: Jan. 25, 1990

[51] Int. Cl.⁵ ............................................. F16K 17/14
[52] U.S. Cl. ................................. 137/68.1; 137/68.2
[58] Field of Search ............................ 137/68.1, 68.2

[56] References Cited

U.S. PATENT DOCUMENTS 3,129,716  4/1964  Fox ..................................... 137/68.1
3,134,390  5/1964  Porter ................................ 137/68.1
3,913,604  10/1975  Hanson et al. ................. 137/68.2 X

FOREIGN PATENT DOCUMENTS 702815  1/1965  Canada ............................... 137/68.1

Primary Examiner—John C. Fox
Attorney, Agent, or Firm—John R. Benefiel

[57] ABSTRACT

A device is disclosed for very rapidly releasing fluid under pressure from a reservoir in which a sharpened pin is driven at an angle into the center of a sealing diaphragm to release the fluid under pressure from the reservoir.

3 Claims, 2 Drawing Sheets

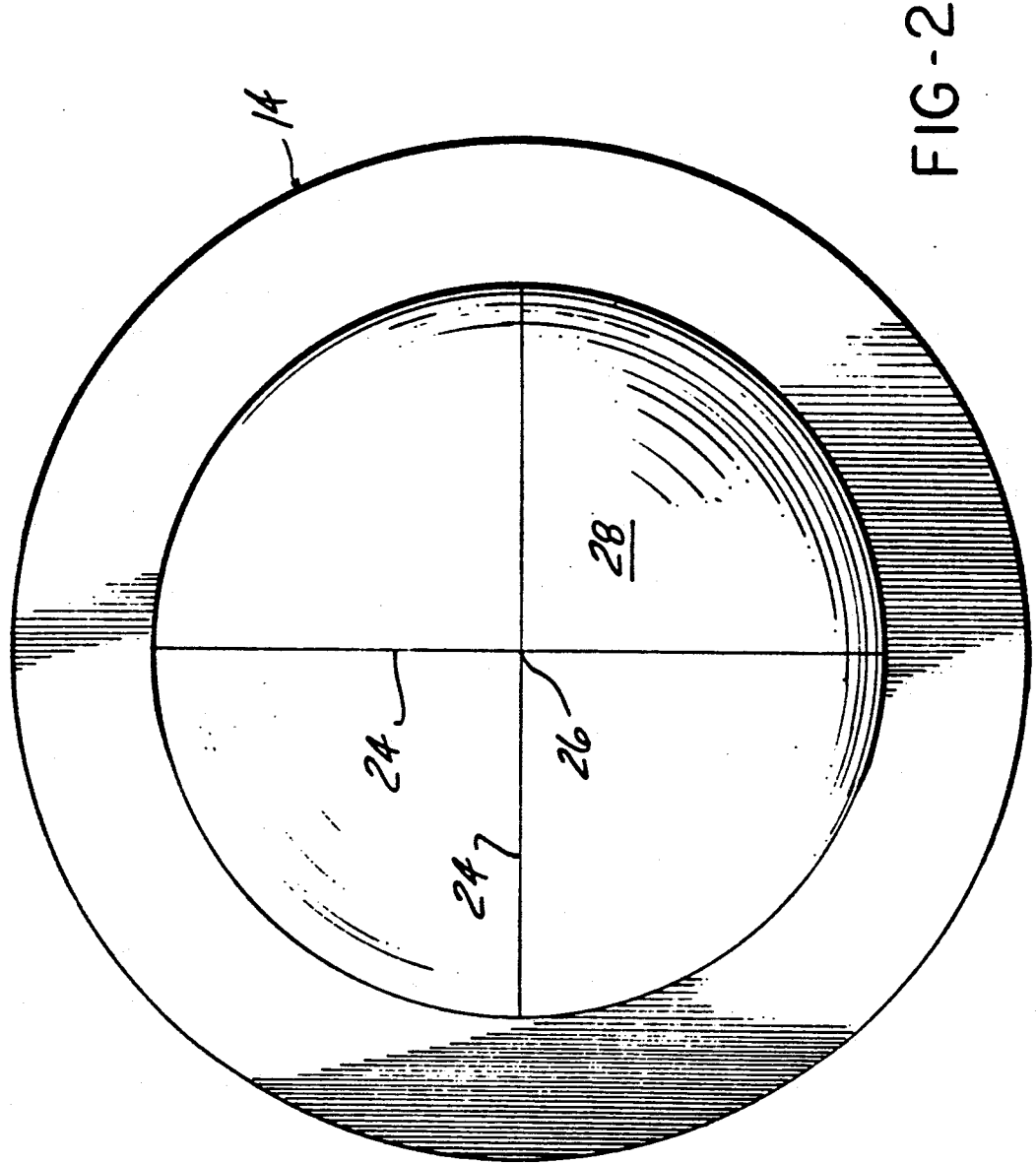

PRESSURE RELIEF DEVICE

BACKGROUND OF THE INVENTION

This invention concerns devices for rapidly releasing fluid under pressure from a reservoir. So called "air bag" safety cushion devices used in auto vehicles rely on very rapid inflation of an air bag at the moment a serious collision occurs. Testing and development of these systems require numerous test inflations to be carried out, but since pyrotechnic devices are typically employed in actual air bag inflations, such tests are costly and require licensed facilities.

It is difficult or impossible to simulate the gas flow in such systems with reservoirs opened with conventional valving due to the very high rates of flow occurring almost instantaneously when an air bag system is activated.

There are other applications where a very rapid opening of a fluid passage would be desirable, preferably with a simple, reliable device.

There has heretofore been employed various bursting pieces associated with pressure release discs, but these have been relatively bulky members partially blocking flow in the discharge passage.

SUMMARY OF THE INVENTION

The present invention comprises a frangible sealing disc or diaphragm installed in a passage extending from the high pressure reservoir. A puncturing pin is mounted on the downstream side of the disc inclined at an angle so that its longitudinal axis intersects the center of the disc, the disc distended as by preforming and/or the exertion of the pressure in the reservoir towards its downstream side. A selectively operable driving means is associated with the pin to enable driving of the pin to force a sharpened end into the distended center of the disc. Penetration of the center of the disc by the sharpened end causes rupturing along radial lines prescored into the disc.

The rupturing disc releases fluid under pressure from the reservoir very rapidly which has been found to closely simulate the flow characteristics of typical gas generators used in air bag restraint systems.

DESCRIPTION OF THE DRAWINGS

FIG. 2 is a plan view of the rupture disc incorporated in the device shown in FIG. 1.

DESCRIPTION

Figure 1:
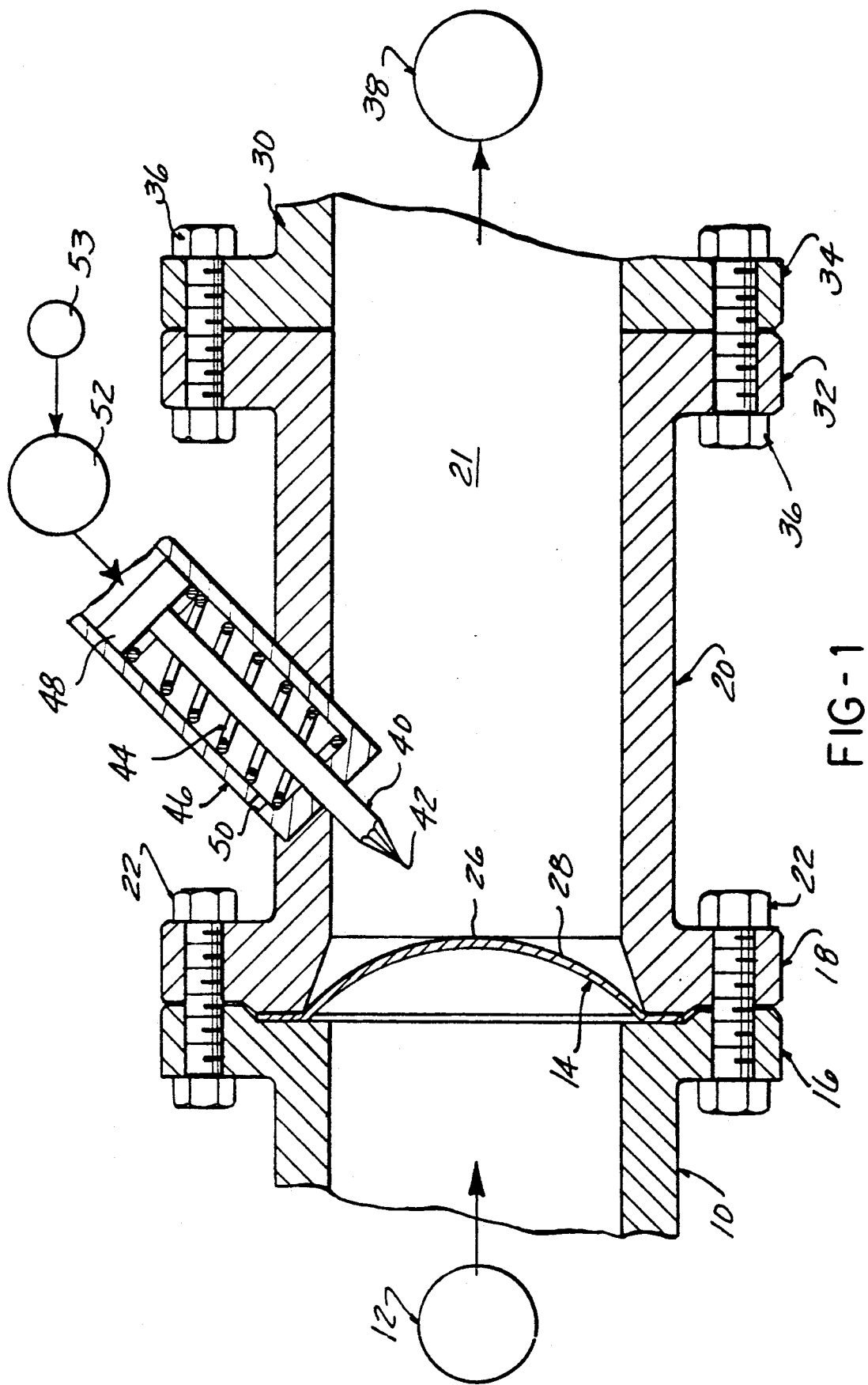
FIG. 1 is a transverse sectional view of the device according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

FIG. 1 shows a release conduit 10 in communication with a pressure reservoir 12, shown diagrammatically. The conduit 10 is sealed by a diaphragm 14 having its periphery clamped between flange 16 of conduit 10 and flange 18 of a housing 20, these flanges secured together with threaded fasteners 22.

The diaphragm 14 is disc shaped and may be of various materials such as metal or plastic, designed with a thickness to be of sufficient strength to normally withstand whatever pressure exists in reservoir 12. The diaphragm 14 is scored with radially extending score lines 24 (FIG. 2) which intersect at the center 26 of the diaphragm 14. The diaphragm 14 is also formed with a dished or distended bulge feature 28 located on the downstream side as installed.

The housing 20 has an internal cavity 21, and is secured to a discharge conduit 30 by means of mating flanges 32, 34 and threaded fasteners 36

The discharge conduit 30 receives flow from cavity 21 of the housing 20, and directs outflow to a downstream device 38 which utilizes the outflow, such as an air bag installation to be test deployed.

An elongated pin 40 is installed extending through a sidewall of the housing 10, inclined at an acute angle as shown so that its longitudinal axis intersects the bulged center 36 of the diaphragm 14. The sharpened tip 42 of the pin 40 is directed towards the diaphragm 14, but normally held retracted as shown in FIG. 1 by a compression spring 44 contained in a plunger housing 46 engaging a plunger head 48 of the pin 40 to urge it to the retracted position shown. The housing 46 is vented at 50 to insure free movement of the pin 40 in the housing 46.

An actuator 52 is provided, selectively operable to drive the pin 40 so to cause the sharpened end 42 of pin 40 to penetrate the center 36 of the diaphragm 14. A suitable actuator may take many forms, such as a pneumatic device, or a mechanical spring operated device as are used to drive firing pins in firearms. Penetration of the center 36 of diaphragm 14 causes the diaphragm 14 to burst under the pressure contained in the reservoir 12, tearing open along the score lines 24, the segments peeling back in flower petal fashion against the interior of the housing 20, to allow immediate release of the gas under pressure in the reservoir 12. The spring 44 causes retraction of the pin 40 so that a substantially unimpeded flow path is afforded for discharge of the fluid under pressure in the reservoir 12.

It has been found that this device provides a discharge flow characteristic similar to the gas generators used in air bag systems in that a very rapid valvelike action is achieved.

At the same time the device is simple and reliable and may be manufactured at low cost.

Variations in thickness and material of the diaphragm 14 may be used to vary the discharge flow characteristics for a particular application.

I claim:

1. A pressure relief device for selective control over the discharge of a fluid under pressure from a conduit connected to a reservoir out a discharge passage, said device comprising:

a housing connected between said reservoir conduit and discharge passage, said housing having a cavity allowing flow of gas from said reservoir to said discharge passage;

a generally disc shaped diaphragm mounted across said housing cavity to seal flow of gas therethrough, said diaphragm having a bulging protrusion extending downstream, a series of radially extending score lines impressed on said protrusion crossing at the center thereof;

an elongated pin having a sharpened end;

mounting means mounting said pin to extend through a wall of said housing downstream from said diaphragm, said pin having its longitudinal axis inclined at an acute angle to said diaphragm and having the sharpened end thereof directed at the center of said protrusion;

said mounting means including means normally holding said pin retracted away from contact with said diaphragm;

selectively operable actuation means for driving said sharpened end of said pin against the center of said diaphragm to penetrate said diaphragm and cause bursting thereof to release said fluid under pressure from said reservoir.

2. The device according to claim 1, said mounting means including retraction means for withdrawing said pin away from said diaphragm after penetration thereof.

3. A method of selectively allowing discharge of fluid under pressure from a reservoir, through a reservoir conduit to a discharge passage, comprising the steps of:

sealing the conduit with a diaphragm installed to extend across said conduit, said diaphragm formed to bulge downstream;

scoring said diaphragm protrusion with radial lines crossing at the center;

positioning an elongated pin downstream of and angled acutely to said diaphragm, and having its longitudinal axis aligned with the center of said diaphragm;

driving a sharpened end of said pin into the center of said protrusion of said diaphragm so as to penetrate said diaphragm and cause bursting of said diaphragm to release said pressure, retracting said pin away from said diaphragm after penetration of said center of said diaphragm.

* * * * *